United States Patent
Scharlach

(10) Patent No.: US 10,770,949 B2
(45) Date of Patent: Sep. 8, 2020

(54) ELECTRIC MACHINE AND MOTOR VEHICLE

(71) Applicant: AUDI AG, Ingolstadt (DE)

(72) Inventor: Albert Scharlach, Oberdolling (DE)

(73) Assignee: AUDI AG, Ingolstadt (DE)

( * ) Notice: Subject to any disclaimer, the term of this patent is extended or adjusted under 35 U.S.C. 154(b) by 294 days.

(21) Appl. No.: 15/976,155

(22) Filed: May 10, 2018

(65) Prior Publication Data

US 2019/0006908 A1    Jan. 3, 2019

(30) Foreign Application Priority Data

Jun. 30, 2017   (DE) .................. 10 2017 211 135

(51) Int. Cl.
| | |
|---|---|
| *H02K 9/00* | (2006.01) |
| *H02K 5/20* | (2006.01) |
| *H02K 9/19* | (2006.01) |
| *H02K 9/193* | (2006.01) |
| *H02K 9/197* | (2006.01) |
| *H02K 1/32* | (2006.01) |

(52) U.S. Cl.
CPC ............. *H02K 5/20* (2013.01); *H02K 1/32* (2013.01); *H02K 9/19* (2013.01); *H02K 9/193* (2013.01); *H02K 9/197* (2013.01)

(58) Field of Classification Search
CPC .. H02K 9/19; H02K 5/20; H02K 1/20; H02K 1/32; H02K 9/20; H02K 9/005; H02K 9/04; H02K 9/14; H02K 15/14; H02K 9/08; H02K 9/12

USPC ............. 310/52–59, 89, 245.1, 261.1, 262
See application file for complete search history.

(56) References Cited

U.S. PATENT DOCUMENTS

| | | | |
|---|---|---|---|
| 8,803,380 B2 * | 8/2014 | Chamberlin | H02K 5/20 310/54 |
| 9,762,106 B2 * | 9/2017 | Gauthier | H02K 9/19 |
| 9,863,430 B2 * | 1/2018 | Lee | F04D 17/10 |
| 2005/0151431 A1 | 7/2005 | Cronin et al. | |
| 2005/0206252 A1 * | 9/2005 | Georg | H02K 5/20 310/59 |
| 2007/0024129 A1 * | 2/2007 | Pfannschmidt | H02K 1/32 310/59 |

(Continued)

FOREIGN PATENT DOCUMENTS

| | | |
|---|---|---|
| CN | 101627523 A | 1/2010 |
| CN | 105680623 A | 6/2016 |

(Continued)

OTHER PUBLICATIONS

Office Action dated Dec. 3, 2019, in corresponding Chinese Application No. 201810696902.1 including partial machine-generated English language translation; 12 pages.

(Continued)

*Primary Examiner* — Thanh Lam

(74) *Attorney, Agent, or Firm* — Maier & Maier, PLLC

(57) ABSTRACT

An electric machine with a housing, in which a stator having a plurality of winding heads is arranged. The housing has at least one cooling channel through which can flow a cooling medium. The cooling channel has at least one circular-shaped or circular-segment-shaped annular channel section, by way of which the cooling medium can be introduced to at least one winding head through at least one opening.

12 Claims, 4 Drawing Sheets

(56) References Cited

U.S. PATENT DOCUMENTS

| | | | |
|---|---|---|---|
| 2007/0216236 A1* | 9/2007 | Ward | H02K 9/19 |
| | | | 310/54 |
| 2008/0024020 A1 | 1/2008 | Iund et al. | |
| 2009/0015081 A1 | 1/2009 | Takenaka et al. | |
| 2012/0025638 A1 | 2/2012 | Palafox et al. | |
| 2013/0076168 A1* | 3/2013 | Memminger | H02K 9/00 |
| | | | 310/54 |
| 2013/0270938 A1 | 10/2013 | Matsuda | |
| 2016/0006302 A1* | 1/2016 | Gugel | H02K 3/24 |
| | | | 310/54 |
| 2016/0164377 A1 | 6/2016 | Gauthier et al. | |

FOREIGN PATENT DOCUMENTS

| | | |
|---|---|---|
| DE | 10 2012 019 749 A1 | 4/2014 |
| DE | 10 2012 022 453 A1 | 5/2014 |
| DE | 10 2014 224 941 A1 | 6/2016 |
| EP | 0 329 790 A1 | 8/1989 |
| EP | 1 892 512 A2 | 2/2008 |

OTHER PUBLICATIONS

Examination Report dated Mar. 29, 2018 of corresponding German application No. 10 2017 211 135.6; 7 pgs.
European Search Report dated Oct. 31, 2018, in connection with corresponding EP Application No. 18168678.3 (11 pgs., including machine-generated English translation).
Examination Report dated May 15, 2020, in corresponding European patent application No. 18168678.3 including partial machine-generated English language translation; 11 pages.

* cited by examiner

ELECTRIC MACHINE AND MOTOR VEHICLE

FIELD

The invention relates to an electric machine with a housing, in which a stator having a plurality of winding heads is arranged, wherein the housing has at least one cooling channel through which can flow a cooling medium. In addition, the invention relates to a motor vehicle.

BACKGROUND

Electric machines, which are designed for high rated powers, may require cooling during operation, in order to particularly cool current-carrying components of the electric machine. In particular, a cooling of winding heads of one or a plurality of stator windings may be necessary, since these can greatly heat up during operation due to the currents flowing through them. Various possibilities for cooling such winding heads are known from the prior art.

A cooling arrangement for an electric machine is described in DE 10 2014 224 941 A1, in which a cooling oil can be introduced to the winding heads of a stator by way of oil lances arranged in the housing of the electric machine. In this case, the oil lances are connected via a distributor strip that is also arranged inside the housing. The cooling oil can be conveyed to the oil lances by way of the distributor strip.

DE 10 2012 019 749 A1 describes an electric machine for a motor vehicle drive train, in which a cooling oil can be introduced to the winding heads of the stator by way of a plurality of pipelines penetrating the housing. In addition to this, a heat exchanger is provided, which is arranged on a casing surface of a laminated core of the stator in order to enable an additional discharge of heat from the electric machine.

In EP 0 329 790 A1, a cooling system for an electric motor is described, in which a cooling oil is sprayed onto the winding heads from nozzles arranged on the front side. An improved cooling of the stator windings is achieved thereby when compared with a cooler disposed externally on the housing.

SUMMARY

The object of the invention is based on providing an improved electric machine.

In order to achieve this object, it is provided according to the invention that the cooling channel comprises at least one circular-shaped or circular-segment-shaped annular channel section, by way of which the cooling medium can be introduced through at least one opening to at least one winding head.

The advantage of the solution according to the invention consists in the fact that a simplified construction of the electric machine is achieved by the circular-shaped or circular-segment-shaped annular channel section of the cooling channel running in the housing, but at the same time, the cooling medium can be introduced to one or a plurality of the winding heads of the electric machine. In this case, the housing can be fabricated in one piece with the integrated cooling channel, or it can be assembled from a plurality of housing components. The cooling channel preferably runs inside a wall of the housing in this case. The stator of the electric machine is preferably directly fastened to the housing. In this case, the housing can be designed, in particular, so that it encloses the entire electric machine, at least in the circumferential direction. Therefore, no additional components for the transport of a cooling medium are required for the cooling.

The annular channel section of the cooling channel in this case may follow the course of the stator and possess a circular shape, in particular running concentric to the stator. Alternatively, an annular channel segment may also have a circular-segment-shaped course. For an electric machine, whose cooling channel comprises a plurality of annular channel segments, both annular channels with a circular-shaped course as well as annular channels with a circular-segment-shaped course can be provided.

The annular channel section has at least one opening, by way of which the cooling medium can be introduced to at least one winding head. Preferably, the annular channel segment has at least one opening for each winding head to be cooled.

The winding heads of the stator can be formed, for example, by stator windings exiting from the stator on the end face, wherein the stator windings, for example, are composed of copper wires coated with insulating paint. For example, the housing may be composed of metal and/or plastic and can be fabricated in one piece in a casting process or can be assembled from a plurality of parts composed of metal or plastic. For example, the annular channel segment can be fabricated as a separate part and assembled with additional parts in order to form the housing, whereby housings with a cooling channel running in their interior can be fabricated in a simple way.

According to the invention, it can be provided that the at least one opening is a nozzle, through which the cooling medium can be introduced to at least one winding head by spraying. In this case, the nozzle is preferably found in a position that is somewhat distanced from the winding head, so that the cooling medium discharged through it can be sprayed over a surface of the winding head that is as large as possible. The cooling medium sprayed onto the winding head runs along the winding head, whereby it absorbs heat from the winding head.

A preferred embodiment of the invention provides that the cooling medium can be introduced via the annular channel section to at least one winding head lying on top in the installed position of the electric machine. Depending on the number and arrangement of the winding heads of the electric machine in each case, the latter may also have two top-lying winding heads, wherein in this case, the cooling medium can preferably be introduced to both top-lying winding heads via the annular channel section.

It can be provided according to the invention that the cooling medium can be introduced via the annular channel section to a plurality of winding heads disposed at a distance from one another in the circumferential direction of the electric machine. The stator of the electric machine is preferably of cylinder shape, so that a plurality of winding heads can be arranged on an end face in the circumferential direction of the stator. The annular channel section of the cooling channel in this case may have a circular shape or circular-segment shape, wherein the cooling medium can be introduced to the winding heads disposed at a distance from one another in the circumferential direction of the electric machine, preferably by way of at least one opening of the annular channel in each case.

In a preferred embodiment of the invention, it can be provided that the cooling channel comprises two annular channel sections, which are distanced from one another in the longitudinal direction of the electric machine, the cooling medium being able to be introduced via one of the annular channel sections at least to a winding head on one side of the stator, and the cooling medium being able to be introduced via the other annular channel section at least to a winding head on the other side of the stator. In this way, the first cooling medium can be introduced in each case to at least one winding head via the annular channel sections on each end face of the stator. It is also possible that on each side of the stator, the cooling medium can be introduced to a plurality of winding heads disposed at a distance from one another, for example, in the circumferential direction of the electric machine. A cooling of winding heads on both sides of the stator of the electric machine is made possible by the two annular channel sections that are distanced from one another.

In addition, it can be provided according to the invention that the cooling channel comprises at least one connection section that joins the two annular channel sections to one another. The connection section in this case can run particularly in the longitudinal direction of the electric machine and join the two annular channel sections to one another. A plurality of connection sections running in the longitudinal direction, which are disposed at a distance from one another in the circumferential direction, and which connect the two annular channel sections in this way to one another at a plurality of sites, can also be provided.

For supplying the cooling agent, it can be provided according to the invention that the housing has at least one connection communicating with the cooling channel for the supply of the cooling medium. In particular, a connection can be provided in the upper region of the electric machine in the installed position, and the cooling medium can be introduced to the cooling channel by this connection. The electric machine may also have a run-off for the cooling medium at the bottom-lying side in the installed position, and the cooling medium, after it has been introduced to the winding heads, can be discharged from the inside of the electric machine via this run-off. The run-off in this case can be joined, for example, to a sump lying on the bottom of the electric machine, and cooling medium flowing out or dripping out from the winding heads can collect in this sump. The cooling channel can be connected via the connection and the run-off to a cooling medium circuit, which may comprise, for example, a heat exchanger for delivering heat and a pump for conveying the cooling medium.

The sump can be designed, in particular, so that for cooling, one or a plurality of winding heads lying on the bottom in the installed position of the electric machine are covered at least partially by the cooling medium found in the sump. Preferably, the winding heads that are not covered by the cooling medium in the sump are acted upon by the first cooling medium via at least one of the circular-shaped or circular-segment-shaped annular channel sections of the cooling channel. In this way, a cooling of all winding heads of the electric machine is achieved.

It can be provided according to the invention that the electric machine comprises a shaft with a shaft cooling channel, wherein the cooling channel is connected to the shaft cooling channel. The shaft cooling channel in this case, for example, can run on the inside of a hollow shaft, wherein the cooling medium can be introduced to the shaft cooling channel by way of additional channel sections of the cooling channel over the housing. The discharge of heat from inside the machine by way of the cooling medium will be further improved by such a shaft cooling channel. In this case, the shaft cooling channel can be connected to a cooling circuit, so that the cooling medium can again be fed into the cooling channel of the housing after passing through a heat exchanger, for example, by way of a pump.

For the cooling agent, it can be provided according to the invention that it is an electrically insulating liquid, in particular, a cooling oil. Due to the use of an electrically insulating liquid such as a cooling oil, the occurrence of electrical short circuits is avoided inside the machine, in particular, in the region of the winding heads.

A preferred embodiment of the invention provides that the housing has an additional cooling channel through which can flow another cooling medium, in particular, cooling water, wherein the additional cooling channel runs adjacent to the cooling channel, at least in sections. The additional cooling channel is thus separate from the cooling channel in this case, so that the cooling medium cannot mix with the additional cooling medium. The additional cooling channel may run, for example, in the circumferential direction in the housing, wherein, in particular it is adjacent to the at least one annular channel section of the cooling channel, such that a cooling of the cooling medium is made possible by the additional cooling medium. Preferably, cooling water is used for the additional cooling medium. The cooling of the electric machine will be further improved by the additional cooling channel. Due to an additional cooling channel that runs in the circumferential direction of the housing and is arranged adjacent to the at least one annular section of the cooling channel, a region that is as large as possible is additionally formed, in which the cooling channel is disposed adjacent to the additional cooling channel.

For the housing, it can be provided according to the invention that it is made in one piece or that it is made of at least two housing components. In the case of a one-piece housing, the cooling channel runs inside a one-piece housing wall. A housing composed of at least two housing components preferably comprises an inner housing component as well as an outer housing component, which at least partially surrounds the inner housing component and connects to this inner housing component. The inner housing component and the outer housing component in this case may be shaped, for example, cylindrically, in particular as a hollow cylinder. Preferably, the cooling channel can be formed as a depression in a surface or casing surface of the inner housing component, this surface facing the outer housing component, so that the cooling channel is bound by the inner housing component and the outer housing component. Additionally or alternatively thereto, the cooling channel can also be formed as a depression in a surface or casing surface of the outer housing component, this surface facing the inner housing component. Also, an additionally present additional cooling channel, as needed, can be formed as a depression in a surface or casing surface of the inner housing component, this surface facing the outer housing component, and/or as a depression in a surface or casing surface of the outer housing component, this surface facing the inner housing component. Sealing means, such as, for example, sealing rings or gaskets, can be disposed between the inner housing component and the outer housing component.

For a motor vehicle according to the invention, It is provided that it comprises at least one electric machine according to the invention.

The electric machine can be used, for example, for the drive of the motor vehicle. In this case, for example, it may involve a drive of a purely electric motor vehicle or an electric machine of a motor vehicle with hybrid drive. The motor vehicle may have one or a plurality of cooling medium circuits, which are connected to the cooling channel(s) of the electric machine.

BRIEF DESCRIPTION OF THE FIGURES

Additional advantages and details of the present invention result from the examples of embodiment, as well as on the basis of the drawings. Here.

DETAILED DESCRIPTION

Figure 1:
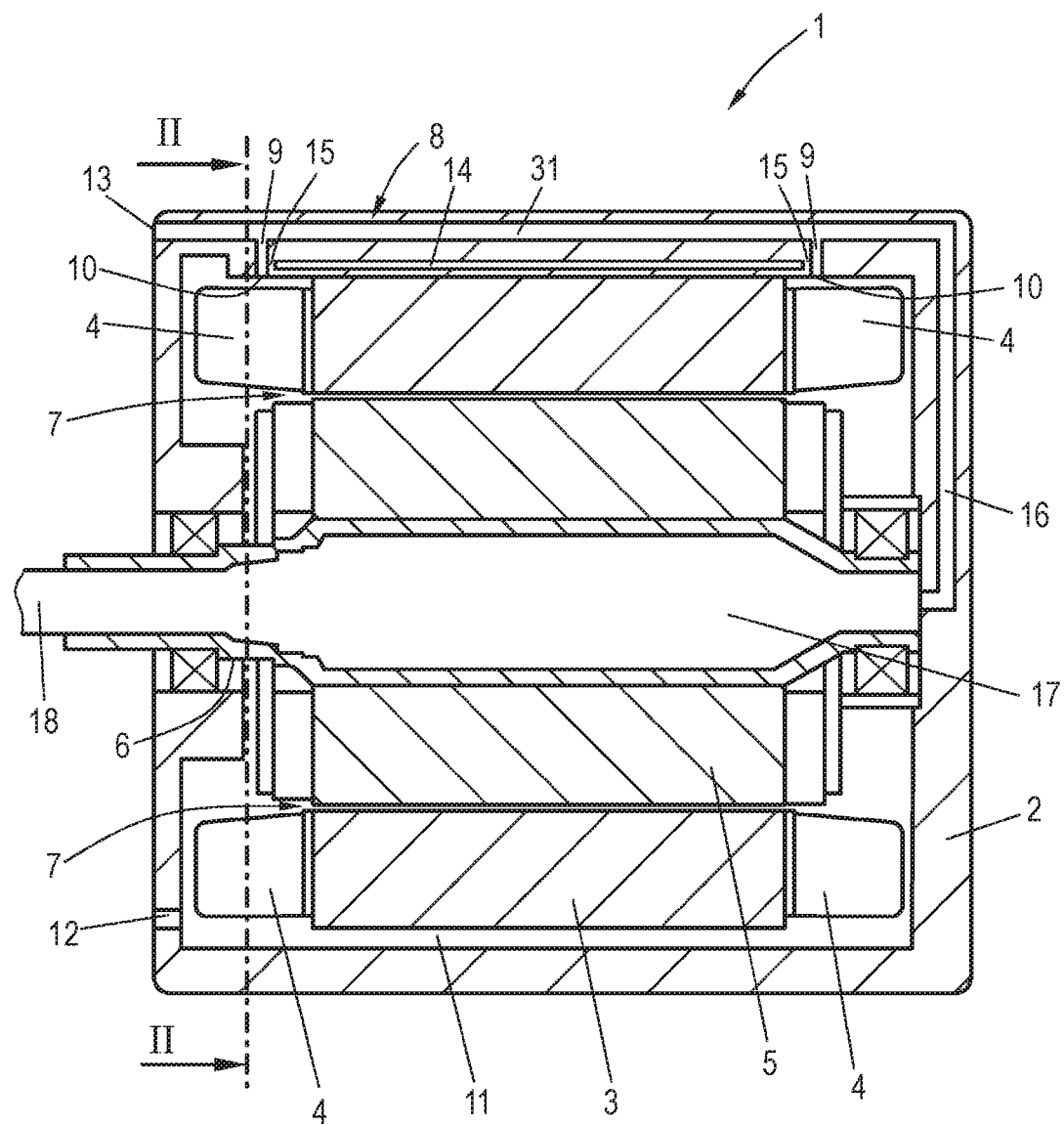
FIG. 1 shows a sectioned lateral view of an exemplary embodiment of an electric machine according to the invention.

FIG. 1 shows a longitudinal section of an electric machine 1 according to the invention. The electric machine 1 comprises a one-piece housing 2, to which a stator 3 is fastened. On each of its two ends, the stator 3 has a plurality of winding heads 4 arranged in the circumferential direction. The winding heads 4 are each formed from stator windings exiting from the stator 3 on the end face. The stator windings can be formed, for example, from copper wires coated with insulating paint. In addition, the electric machine 1 comprises a rotor 5, which is connected to a shaft 6. An air gap 7 is formed between the rotor 5 and the stator 3.

The housing 2 has a cooling channel 8 through which can flow a cooling agent, e.g., a cooling oil. This cooling channel 8 comprises two annular channel sections 9 in this exemplary embodiment. The annular channel sections 9 are distanced from one another in the longitudinal direction of the electric machine 1, and are connected by way of a connection section 31 running in the longitudinal direction of the electric machine 1, so that a cooling of the winding heads 4 on both sides of the stator 3 can be produced thereby. In order to introduce the cooling oil to the winding heads 4, in each case, the annular channel sections 9 have a plurality of openings 10 designed as a nozzle, each of which is arranged adjacent to a winding head 4. The cooling oil flowing in the cooling channel 8 through the openings 10 can be introduced to the winding heads 4 by spraying.

The cooling oil sprayed onto the winding heads 4 runs along the heads, absorbing heat from the winding heads 4. The cooling oil dripping or flowing out from the winding heads subsequently collects in a cooling oil sump 11 in the bottom part of the electric machine 1. The cooling oil can flow out of this cooling oil sump 11 through the run-off 12 and can be introduced into a cooling circuit, which is not shown further here. The cooling circuit, for example, may comprise a pump for conveying the cooling oil, as well as a heat exchanger, to which the cooling oil can deliver the heat absorbed from the winding heads 4. Subsequently, the cooling oil flowing in the circuit can again be introduced through a connection 13 to the cooling channel 8 running in the housing 2.

In addition, the housing 2 has an additional cooling channel 14, through which flows cooling water. The additional cooling channel 14 runs in the inside of housing 2 in the circumferential direction of the electric machine 1. In this case, the additional cooling channel 14 is arranged adjacent to the annular channel sections 9 in the regions 15. The annular channel sections 9 also run inside the housing 2 in the circumferential direction of the electric machine 1. In the regions 15, the housing material, for example, metal or plastic, has a lesser thickness, so that a heat transfer that is as optimal as possible is enabled from the cooling oil in the annular channels 9 to the cooling water in the additional cooling channel 14. The housing 2 can be fabricated in one piece, for example, in a casting process from metal or plastic, or, as is shown below in FIG. 3, can be assembled from a plurality of parts, wherein, for example, the annular channels can be formed wholly or partially of one part or a plurality of parts.

The cooling channel 8 is connected via an additional channel section 16 to a shaft cooling channel 17 running in the shaft 6 executed as a hollow shaft. In this way, the cooling oil flowing through the cooling channel 8 can be additionally introduced to the winding heads 4 also inside the shaft 6. The cooling oil can be introduced to a cooling agent in the cooling medium circuit via an outlet 18 of the shaft. In this way, in particular, this may involve the same cooling medium circuit to which the cooling oil flowing out of the run-off 12 is also introduced.

Figure 2:
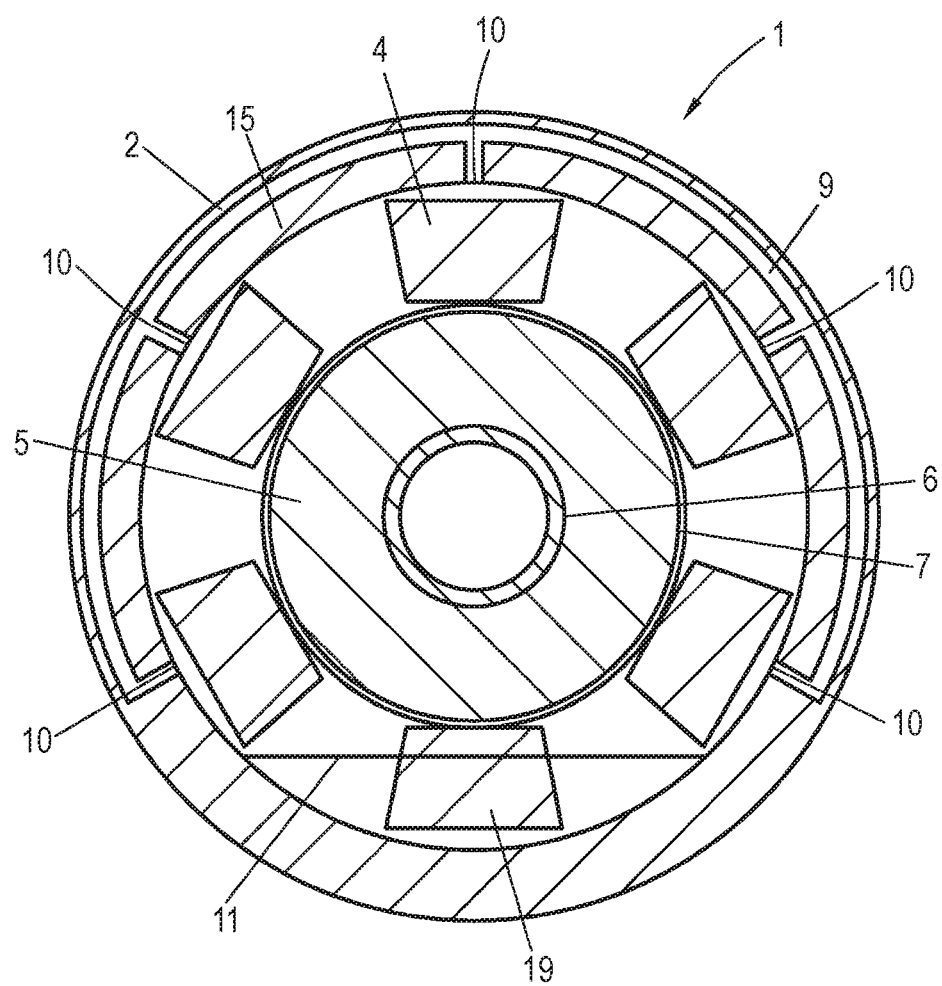
FIG. 2 shows another sectioned lateral view of an electric machine according to the invention.

FIG. 2 shows a cross section of the electric machine 1 according to the invention corresponding to the cutting line II of FIG. 1. In this view, a circular-segment-shaped course of the annular channel section 9 can be recognized. The annular channel section 9 has a plurality of openings 10, each of which is arranged opposite and adjacent to a winding head 4 of the stator. With the exception of the bottom-lying winding head 19, which is partially covered by the oil of the cooling oil sump, cooling oil can be introduced to each of the winding heads 4 over the annular channel 9 by spraying. Each of the winding heads 4, 19 of the electric machine 1 can be cooled in this way. An additional annular channel that is arranged at a distance in the longitudinal direction of the electric machine 1 and that serves for cooling of winding heads on the other side of the stator, may have a course corresponding to this representation, so that all winding heads of the electric machine can be cooled.

Figure 3:
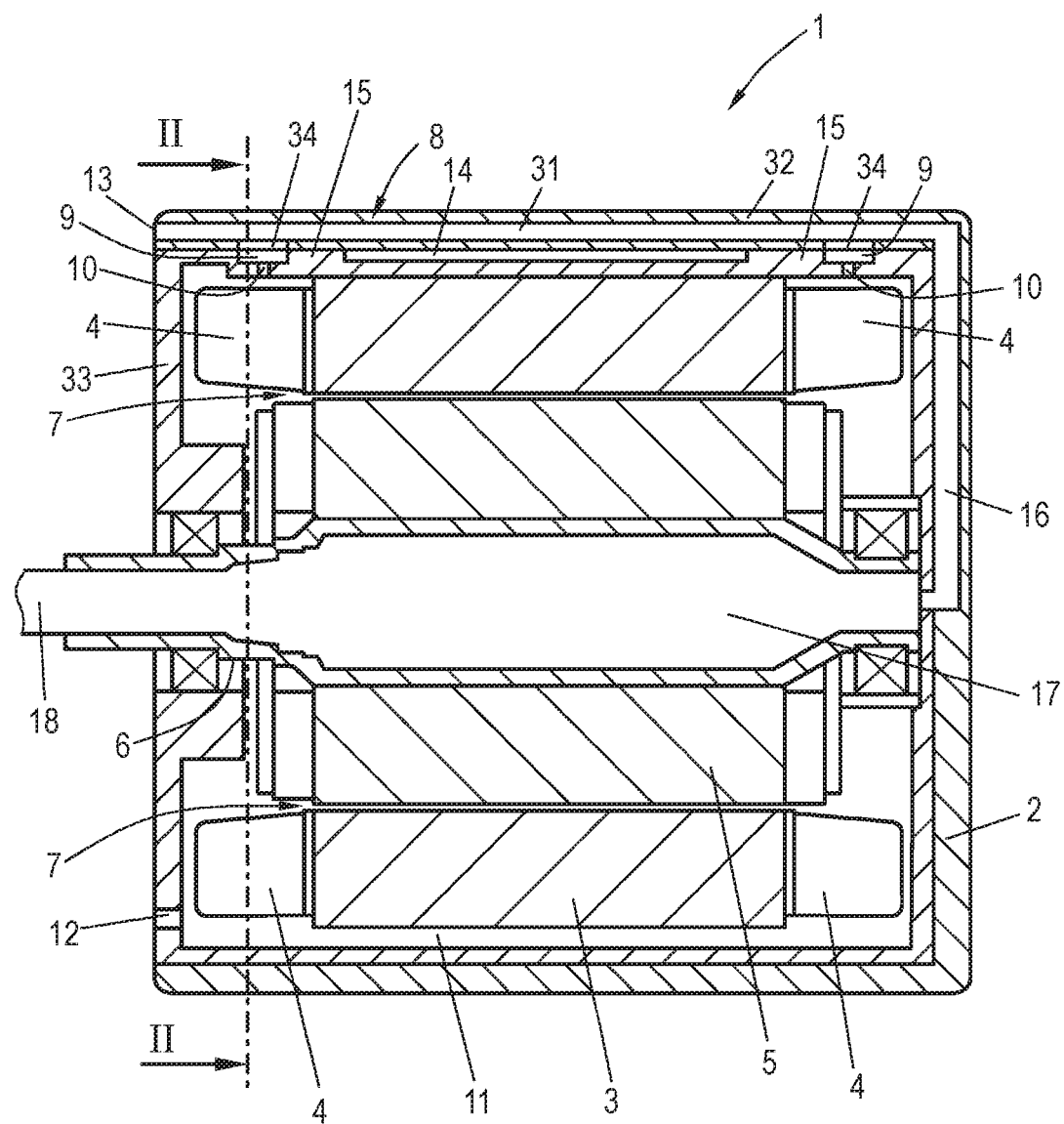
FIG. 3 shows a sectioned lateral view of another exemplary embodiment of an electric machine according to the invention.
Figure 4:
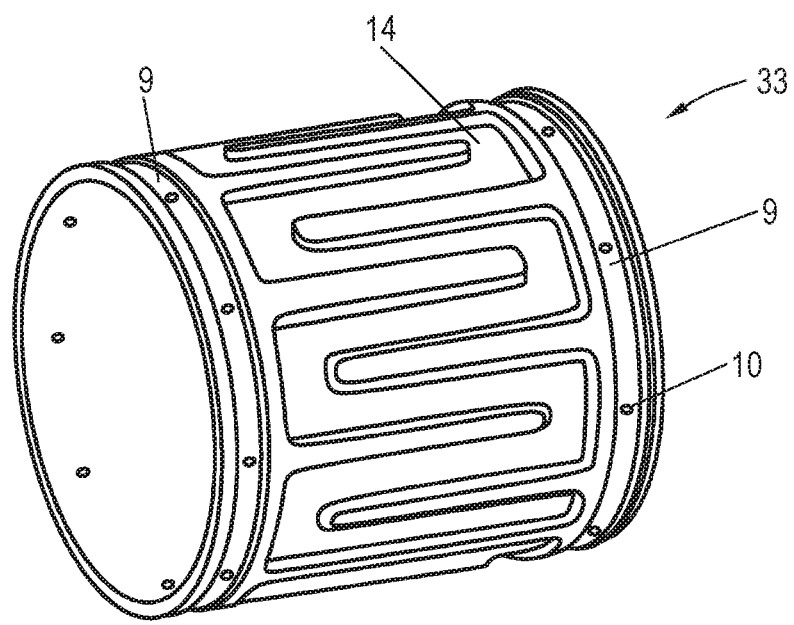
FIG. 4 shows a perspective view of an inner housing component.

An alternative example of embodiment of an electric machine 1 according to the invention is shown in FIG. 3, in which the housing 2 is composed of an outer housing component 32 and an inner housing component 33. The other components correspond to the embodiment shown in FIG. 2 and are characterized by the same reference numbers. The inner housing component 33 has depressions on its surface or casing surface facing the outer housing component 32, and the annular channel segments 9 as well as the additional cooling channel 14 are formed by these depressions. A perspective view of an inner housing component 33 is shown in FIG. 4. The annular channel sections 9 as well as the meandering additional cooling channel 14 are delimited in the radial direction toward the outside by the outer housing component 32. In the outer housing component 32, the connection section 31 of the cooling channel 8 is formed, this connection section communicating with the annular channel sections 9 via openings 34. The additional channel section 16 is delimited by the inner housing component 33 and the outer housing component 32 in this example of embodiment. The inner housing component 33 and the outer housing component 32 may be fabricated, for example, of metal or of plastic. In order to achieve a sealing of the annular channel sections 9 as well as of the additional cooling channel 14, sealing elements, such as, for example, sealing rings, can be arranged between the inner housing component 33 and the outer housing component 32.

Figure 5:
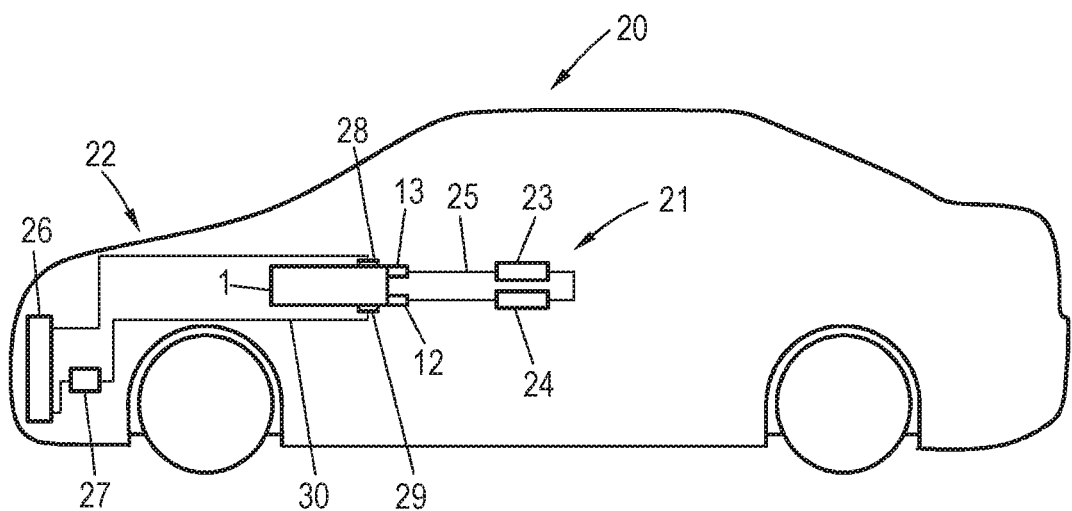
FIG. 5 shows a schematic representation of a motor vehicle according to the invention.

FIG. 5 shows a schematic lateral view of a motor vehicle 20 according to the invention. The motor vehicle 20 comprises an electric machine 1, which is designed as an electric motor for the drive of the motor vehicle 20. In addition, the motor vehicle 20 comprises a cooling oil circuit 21 as well as a cooling water circuit 22. The cooling oil circuit 21 comprises a pump 23 for conveying the cooling oil and a heat exchanger 24, by way of which the cooling oil can deliver heat taken up in the inside of the electric machine In this case, the cooling oil is introduced into the electric machine 1 via cooling oil lines 25 at the inlet 13 of the electric machine 1. The cooling oil is brought back into the cooling oil circuit 21 at the run-off 12 connected to the cooling oil sump 11.

The cooling water circuit 22 likewise comprises a heat exchanger 26 as well as a pump 27. Cooling water can be introduced to the additional cooling channel 14 of the electric machine by way of a connection 28 provided on the top of the electric machine 1, through this cooling circuit. The cooling water can be introduced again to the cooling circuit 22 via cooling water lines 30 through an outlet 29 on the bottom of the electric machine, this outlet corresponding to the additional cooling channel 14.

The invention claimed is:

1. An electric machine with a housing, comprising:
   a stator having a plurality of winding heads,
   wherein the housing has at least one cooling channel through which a cooling medium can flow,
   wherein the at least one cooling channel proceeds at least partially around an annulus of the housing in an annular channel section,
   wherein the annular channel section forms at least one circular-shaped or circular-segment-shaped section around the annulus of the housing,
   wherein the at least one cooling channel comprises at least one opening by way of which the cooling medium is introduced to at least one winding head.

2. The electric machine according to claim 1, wherein the at least one opening is a nozzle, through which the cooling medium can be introduced to at least one winding head by spraying.

3. The electric machine according to claim 1, wherein the cooling medium can be introduced by way of the annular channel section at least to one winding head lying on top in the installed position of the electric machine.

4. The electric machine according to claim 1, wherein the cooling medium can be introduced via the annular channel section to a plurality of winding heads disposed at a distance from one another in the circumferential direction of the electric machine.

5. The electric machine according to claim 1, wherein the cooling channel comprises two annular channel sections, which are distanced from one another in the longitudinal direction of the electric machine, wherein the cooling medium can be introduced via one of the annular channel sections at least to one winding head on one side of the stator, and the cooling medium can be introduced via the other annular channel section at least to one winding head on the other side of the stator.

6. The electric machine according to claim 5, wherein the cooling channel has at least one connection section that joins the two annular channel sections to one another.

7. The electric machine according to claim 1, wherein the housing has at least one connection communicating with the cooling channel for the introduction of the cooling medium.

8. The electric machine according to claim 1, further comprising:
   a shaft with a shaft cooling channel, wherein the cooling channel is connected to the shaft cooling channel.

9. The electric machine according to claim 1, wherein the cooling medium is an electrically insulating liquid, in particular, a cooling oil.

10. The electric machine according to claim 1, wherein the housing has an additional cooling channel through which can flow another cooling medium, in particular, cooling water, wherein the additional cooling channel runs adjacent to the cooling channel, at least in sections.

11. The electric machine according to claim 1, wherein the housing is composed of one piece, or the housing is composed of at least two housing components.

12. A motor vehicle comprising at least one electric machine according to claim 1.

* * * * *